3,226,261
FUEL CELL ELECTRODES
Jeremy Forten, New York, and Richard J. Roethlein,
Richmond Hill, N.Y., assignors to Leesona Corporation, Cranston, R.I., a corporation of Massachusetts
No Drawing. Filed Nov. 8, 1961, Ser. No. 150,901
2 Claims. (Cl. 136—86)

This invention relates to improved fuel cell electrodes and more particularly to fuel cell electrodes having lithium incorporated in a host metal coated with a thin film of platinum black. The novel structures are especially useful as fuel cell electrodes in a system employing an acid electrolyte.

In the direct production of electricity from a fuel and oxidant, the basic problem encountered in obtaining an efficient system is essentially one of chemical kinetics. It is necessary to carry out the reaction of a fuel and an oxidant so that the proportion of energy degraded into heat is as small as possible. At the same time, the reaction rates must be high enough to economically provide sufficient current output from a practical sized cell. The basic problem is rendered more critical since it is necessary that the components of the cell be highly resistant to corrosion and remain substantially invariant under the operating conditions of the cell. Thus, although the basic concept of the fuel cell has been known at least as early as the 19th century, when Davy and Grove made attempts to carry out the electrochemical oxidation of fuels, it was not until recently that work on fuel cells received renewed impetus. Recent developments have made it apparent that fuel cells are commercially feasible and are capable of far surpassing the efficiency of a heat engine. However, even with the modern developments in fuel cell technology, such cells are still not completely practical from a commercial standpoint and the art is undergoing constant change. A particularly intense field of activity is in the production of improved fuel cell electrodes which will provide the practitioner with an electrode which will withstand the corrosive action of electrolytes together with the necessary activity when operated with conventional fuels at relatively low temperatures.

Accordingly, it is an object of the instant invention to provide a fuel cell electrode which is particularly adapted for a fuel cell system employing an acid electrolyte.

It is another object of the instant invention to provide improved fuel cell cathodes into which elemental lithium has been introduced and which are coated with a thin film of platinum black.

It is another object of the instant invention to provide a fuel cell electrode which will sustain high current densities at relatively low operating temperatures with conventional fuels.

These and other objects of the invention will become more apparent from the following detailed description with particular emphasis being placed on the illustrative examples.

According to the instant invention, an electrode is produced by introducing lithium into a host metal by contacting the metal with elemental lithium at room temperatures and above, but preferably below the melting point of the host metal. Thereafter, the lithiated metal is coated with a thin film of platinum black. These electrodes have been found to have excellent electrochemical characteristics and are particularly useful in acid fuel cell systems at relatively low operating temperatures.

Lithiated materials, which are coated with a thin film of platinum black according to the instant invention have been described in the Forten, et. al. copending application Serial No. 150,903 of even date entitled "Improved Catalytic Systems." As set forth in the above-mentioned application, it is not completely clear how the lithium enters the metal and is bound in it. It is established, however, that lithium actually diffuses into or penetrates the parent metal and becomes incorporated in such a fashion that it is not removed upon immersion in water. While the instant electrodes are particularly useful in a system employing an acid electrolyte, they have been found to provide enhanced results when used with other conventional electrolytes including alkaline hydroxides and carbonates. A substantial improvement is experienced in the fuel cell performance characteristics of a given system when using the instant electrodes in comparison with the use of lithiated materials which have not been coated with platinum black.

Metals which can be conveniently impregnated with elemental lithium for use in the instant invention include the pure elements and alloys of groups IB and VIII of the Mendelyeev's Periodic Table. These materials function most favorably for use in electrodes when lithiated in accordance with the instant procedures and thereafter coated with platinum black. The proper metal to be selected for lithiation will depend to a certain extent upon the electrolyte to be used and conditions under which the fuel cell will be operated. Thus, the electrode must be resistant to corrosion at the operating temperature of the cell. More specifically, the materials into which lithium has been introduced, according to the instant invention include silver, gold, copper and their alloys from group IB and iron, cobalt, ruthenium, nickel, rhodium, platinum, osmium, iridium and palladium and their alloys from group VIII. While the above metals are particularly suited for lithiation and employment in fuel cells, other metals can be employed as long as they will undergo lithiation and are sufficiently resistant to corrosion under the operating conditions of the cell.

Lithium is introduced into the metal by a number of methods. Thus, one method comprises immersing the metal into molten lithium, permitting lithium to diffuse or penetrate the metal. Subsequent to the lithium introduction step, further treatment of the system depends on the nature of the host material. In most cases, the system is removed from the lithium melt into a vacuum or inert atmosphere of helium or argon where it is heated to a temperature in the range from 250° C. to below the melting point of the host metal or alloy. The temperature at which the system is heated and duration of heating are factors which depend on the nature of the host material. Generally, the heating temperature is above 500° C. Thereafter, excess lithium is removed by immersion in water. A second method comprises vapor deposition of lithium onto a metal surface and subsequently heating the lithium-host metal system in an inert gas or vacuum to above about 250° C., and preferably above 500° C., but below the melting point of the host metal or alloy. Excess lithium is then removed by immersion of the lithium host metal system in water. A third method comprises diluting the molten lithium with calcium or barium, forming mixtures, including eutectic mixtures, and immersing the host metal into the molten mixture under an inert atmosphere of helium or argon. Subsequent treatment is as described in the first method. A modified procedure comprises forming a sodium and potassium eutectic mixture and adding a small amount of lithium to the mixture. The coated metal is removed from the melt and subjected to elevated temperatures in inert gas atmosphere or vacuum. Excess lithium is then removed by immersion of the lithium-host metal system into water. This method permits more controllable diffusion of lithium into the host metal.

As another method, lithium compounds are dissolved in a solvent which does not react rapidly or appreciably with pure lithium, and lithium is electroplated onto the host material. For example, lithium halides can be dissolved in solvents such as pyridine or acetonitrile.

The electro-deposition is carried out employing an inert atmosphere over the electrolyte. Thereafter, the lithium-host metal system is subjected to elevated temperatures. Another method comprises the treating of the host metal or alloy with a solution of lithium in liquid ammonia. The host metal or alloy "melted" with lithium ammonia solution is subjected then to elevated temperatures under vacuum. Modifications of the above procedures for depositing the metal can be devised by one skilled in the art.

After the host metal is incorporated with lithium, it can be advantageous to polish the surface of the metal before it is coated with platinum black and employed as an electrode. It has been found that electrodes which have been polished provide enhanced activity.

The amount of lithium which is incorporated in the host metal can be controlled by the method and conditions of introduction. The actual amount of lithium introduced will vary depending on the contemplated end use. However, it has been found that as little as 10 micrograms of lithium introduced into a square centimeter of surface area of the host metal will provide enhanced electrochemical activity. Thus, for a satisfactory electrode, the structure should contain from about 10–200 micrograms of lithium introduced per square centimeter of surface area, with the optimum range being from about 75–150 micrograms lithium introduced per square centimeter of the surface area of the host metal.

After the host metal is lithiated, it is coated with a thin coating of platinum black. Platinum black is obtained, for example, by electrolytically depositing platinum from a chloroplatinate solution. Platinum black absorbs up to about 100 times its volume of oxygen and about 10 times its volume of hydrogen. The actual coating of the lithiated metal with platinum black is performed by methods known in the art, for example, by electro-deposition from an aqueous 2% chloroplatinic acid solution. Other suitable methods can be employed. The density of the platinum black coating is not particularly critical, however, for satisfactory electrochemical performance characteristics, the coating should be from about 0.1–2 mils in thickness.

The electrodes of the instant invention are homo-porous or bi-porous structures with the pore ranging from about 0.1 to about 100 microns in diameter. If the electrode is to be employed with the oxidant, or a liquid or gaseous fuel dissolved or dispersed in the electrolyte, a homo-porous structure is satisfactory. However, in order to accurately control the three phase interface of fuel, electrode and electrolyte where a gaseous fuel is employed, the electrode is preferably bi-porous. Additionally, in a fuel cell where hydrogen is employed as the fuel, it may be desirable to employ a non-porous hydrogen diffusion palladium or palladium-silver alloy membrane incorporated with lithium and coated with a thin porous layer of platinum black. The choice of homo-porous, non-porous or bi-porous electrode depends to a substantial extend upon the metal making up the electrode, whether the electrode is to be used as a cathode or anode and upon the choice of fuel. The proper choice is within the ability of one skilled in the art.

Having described the invention in general terms, the following examples are being set forth to more particularly illustrate the invention. Examples 1–3 demonstrate the preparation of platinum black coated lithiated structures and Examples 4–6 demonstrate the use of the structures as fuel cell electrodes.

EXAMPLE 1

A platinum foil is immersed in molten lithium at 230° C. and held for one tenth of a second. The host metal with lithium diffused into its surface is heated to approximately 520° C. for a period of five minutes before the system is immersed in water to remove excess lithium. The complete operation is performed under an atmosphere of helium which is substantially free of nitrogen and oxygen and water vapor.

The above system is immersed in a 2% aqueous solution of choroplatinic acid and a platinum black surface deposited by electrolytic deposition of the metal from the solution. The electrolytic deposition is carried out at a temperature of 35–40° C., a current density of 2.5 ma./cm.$^2$ for a period of 30 minutes.

EXAMPLE 2

A thin sheet (eight mils thick) of palladium is immersed in a molten 30% lithium-70% calcium alloy eutectic mixture (temperatures being from about 230-260° C.) for a period of one second to five seconds. The lithium-host metal system was removed from the melt and heated to a temperature of 600° C. for two minutes before immersing the system in water to remove excess lithium. The lithiation is substantially uniform throughout the metal surface. The operation is carried out under an atmosphere of argon, substantially free of nitrogen, oxygen and water vapor.

The lithiated metal system is immersed in a 2% aqueous solution of chloroplatinic acid and platinum black is electrolytically deposited at a temperature of 50–55° C. and a current density of 2 ma./cm.$^2$ for a period of 25 minutes. The platinum black surface is substantially porous.

EXAMPLE 3

A nickel sheet eight mils in thickness is immersed for 35 minutes in molten lithium at a temperature of about 450° C. The nickel sheet is removed from the lithium melt and excess lithium wiped off. Upon immersion in water, no lithium and water reaction is observed. The operation was carried out in an atmosphere of argon substantially free of nitrogen, oxygen, and water vapor.

The nickel lithium system is immersed in a 2% aqueous solution of chloroplatinic acid and a platinum black surface deposited at a current density of 1.5 ma./cm.$^2$ for 30 minutes at a temperature of 50° C.–65° C.

In Examples 1–3, the metal which is to be plated can be replaced by other metals including silver, gold, copper and their alloys from group IB and iron, cobalt, nickel, ruthenium, rhodium, osmium, platinum, iridium, palladium and their alloys from group VIII of the Periodic Table. The lithium in the above Examples can be replaced by other metals including calcium, magnesium, rubidium and cesium.

EXAMPLE 4

A fuel cell system employing a sintered palladium electrode prepared as in Example 2 as the cathode, a sintered palladium anode lithiated by vapor deposition and using a five normal aqueous sulphuric acid electrolyte was devised in a suitable housing. The cell when operated at atmospheric pressure and 40° C. employing hydrogen as the fuel, demonstrated excellent electrochemical performance characteristics.

EXAMPLE 5

A fuel cell was devised in a suitable housing employing a sintered porous silver cathode, the platinum foil anode prepared as in Example 1 and using a one normal aqueous potassium hydroxide electrolyte. The cell when operated at atmospheric pressure and a temperature of 50° C. and using methanol as the fuel, demonstrated good electrochemical performance characteristics.

EXAMPLE 6

A fuel cell was devised in a suitable housing having a sintered porous nickel cathode structure prepared as in Example 3 as the anode and a sintered porous platinum-rhodium alloy as the cathode and using a 28% aqueous potassium hydroxide electrolyte. The cell when operated at atmospheric pressure and a temperature of 100° C. employing hydrogen as the fuel demonstrated excellent electrochemical performance characteristics.

The instant electrodes are particularly well suited for use in low temperature cells. Thus, the electrodes can be employed in cells operated at temperatures of from about 20° C. to provide satisfactory current densities. However, since the electrodes are highly stable to heat and corrosion, they can be employed in medium and high temperature cells as well. Thus, it has been found that fuel cell systems employing the instant electrodes can be operated at the temperature range of about 20–600° C. with satisfactory performance.

Fuels known in the prior art can be employed in fuel cells employing the instant electrodes. Thus, hydrazine, methanol, formaldehyde, hydrogen and the carbonaceous fuels are operable. The proper choice of fuel depends primarily on those commercially available and upon the operating conditions of the cell. The proper selection of fuel is within the ability of one skilled in the art.

While various modifications of this invention are described, it should be appreciated that the invention is not restricted thereto, but that other embodiments will be apparent to one skilled in the art which come within the scope and spirit of the invention and the appended claims.

What is claimed is:
1. A fuel cell for the generation of electricity directly from a fuel and oxidant comprising an electrolyte, an oxidizing electrode, a fuel electrode, said electrodes being in contact with said electrolyte, and means for providing fuel cell reactants to said electrodes, at least one of said electrodes comprising a structure having elemental lithium uniformly dispersed in a host metal in at least its surface and coated with a thin film of platinum black, said host metal being a member of the group consisting of Group Ib and Group VIII metals of the Mendelyeev's Periodic Table and said lithium being present in an amount of from 10–200 micrograms per square centimeter of surface area of said host metal.

2. The fuel cell of claim 1, wherein the lithium is present in an amount of from 75–150 micrograms per square centimeter of surface area of said host metal.

References Cited by the Examiner
UNITED STATES PATENTS

| | | | |
|---|---|---|---|
| 2,716,670 | 8/1955 | Bacon | 136—120 |
| 2,914,596 | 11/1959 | Gorin et al. | 136—86 |
| 3,042,551 | 7/1962 | Perry et al. | 136—86 |

FOREIGN PATENTS 232,629   2/1961   Australia.

OTHER REFERENCES

Gilbert: Abstract of Application Serial No. 748,353, published May 16, 1950, O. G. 634, page 985.

WINSTON A. DOUGLAS, *Primary Examiner.*

JOHN MACK, *Examiner.*

D. L. WALTON, *Assistant Examiner.*